United States Patent [19]

Nippert

[11] 4,423,617

[45] Jan. 3, 1984

[54] METHOD OF MAKING A MALE RESISTANCE WELDING ELECTRODE

[75] Inventor: Russell A. Nippert, Delaware, Ohio

[73] Assignee: The Nippert Company, Delaware, Ohio

[21] Appl. No.: 351,056

[22] Filed: Feb. 22, 1982

[51] Int. Cl.³ ............................................. B21D 22/00
[52] U.S. Cl. ..................................... 72/356; 72/264; 72/267; 72/354; 29/825
[58] Field of Search ................. 72/356, 334, 354, 338, 72/340, 267, 358, 264, 256; 29/825, 611; 228/155

[56] References Cited

U.S. PATENT DOCUMENTS

| | | | |
|---|---|---|---|
| 2,371,041 | 3/1945 | Flowers | 72/478 |
| 2,586,336 | 2/1952 | Huck | 72/354 |
| 3,247,698 | 4/1966 | Baldwin et al. | 72/334 |
| 3,779,714 | 12/1973 | Nadkarni et al. | 29/182.5 |
| 3,884,676 | 5/1975 | Nadkarni et al. | 75/0.5 |
| 3,893,844 | 7/1975 | Nadkarni | 75/0.5 R |
| 3,969,156 | 7/1976 | Wallbaum | 148/11.5 R |
| 4,045,644 | 8/1977 | Shafer et al. | 219/119 |
| 4,071,947 | 2/1978 | Nippert | 29/624 |
| 4,288,024 | 9/1981 | Nippert | 228/155 |

FOREIGN PATENT DOCUMENTS 1177351 1/1970 United Kingdom .

Primary Examiner—Francis S. Husar
Assistant Examiner—David B. Jones
Attorney, Agent, or Firm—Biebel, French & Nauman

[57] ABSTRACT

A method of making a male resistance welding electrode includes a forward extrusion step in which the shank portion of the electrode is partially formed by extruding a cut-off billet of dispersion strengthened copper over a pin in a first die. Subsequently, the preform billet produced in the first die is inserted into a second die which defines a tapered shank cavity region around a central pin and a larger cavity region from which the head portion of the electrode is ultimately formed. The shank portion of the electrode is formed and the head portion worked substantially by the application of pressure to the preform billet by a first forming member. Final forming occurs when a second forming member applies pressure to the head of the electrode while the electrode remains in the second die. If desired, a small nose portion may be formed on the tip of the electrode by the second forming member and subsequently removed in a machining or cutting operation, eliminating surface irregularities in the electrode head portion surface.

9 Claims, 10 Drawing Figures

METHOD OF MAKING A MALE RESISTANCE WELDING ELECTRODE

BACKGROUND OF THE INVENTION

The present invention relates to resistance welding electrodes and, more particularly, to an improved method of making a male resistance welding electrode of a dispersion strengthened copper material, such as an internally oxidized copper-aluminum alloy.

Resistance welding has long been used as a quick and effective method of joining metal workpieces. The workpieces to be welded are placed in an abutting relationship and a large electrical current is caused to flow across the boundary between the workpieces by a pair of opposing electrodes. The current flow results in the surfaces of the workpieces being heated sufficiently to cause the formation of a weld nugget. Typically, the electrodes apply significant pressure to the workpieces during the welding operation. This facilitates the welding process by urging the workpieces together and, also, reduces the electrical resistance between the electrode tips and the workpieces.

Since the welding operation is accomplished by electrical resistance heating of the material being welded, it will be appreciated that the electrodes will also be heated substantially. It is important to have electrodes of high electrical conductivity in order to minimize the power loss in the electrodes and, also, to minimize the heating of the electrodes. Hollow electrodes have long been used for resistance welding with a cooling fluid being supplied to the electrode interior in order to reduce the temperature of the electrode. It will be appreciated, however, that this method of cooling has certain limitations and, further, that the electrode tip or head cannot be cooled effectively in this manner.

Electrodes have, in the past, been formed of high conductivity copper in order to minimize the power loss in the electrodes. Such electrodes have a limited life, however, which is due in large part to deformation of the electrode tip after repeated welding operations at high temperature and pressure. This has added significantly to the cost of resistance welding operations since the electrodes are expensive and the down time of a welding machine during replacement of electrodes reduces its capacity significantly.

One material which has recently been developed and which has shown high promise for use in resistance welding electrodes is a dispersion strengthened copper material. This material, formed by internal oxidation of a dilute copper-aluminum alloy, is extremely hard at welding temperatures and displays high electrical and thermal conductivity. U.S. Pat. No. 3,779,714, issued Dec. 18, 1973, to Nadkarni et al; U.S. Pat. No. 3,884,676, issued May 20, 1975, to Nadkarni et al; and U.S. Pat. No. 3,893,841, issued July 8, 1975, to Nadkarni et al, disclose dispersion strengthened metals of the type intended to be used with the method of the present invention. As discussed in the August 1976 edition of *Metals Engineering Quarterly*, pp. 10–15, in an article by Nadkarni et al, this dispersion strengthened copper alloy material produces superior welding electrodes.

British patent specification No. 1,177,351, published Jan. 14, 1970, discloses a method of making a dispersion strengthened electrode tip in which powdered dispersion strengthened material is placed in a mold defining the electrode shape and subjected simultaneously to high temperature, for example 1000° C., and high pressure, for example 500 to 2000 psi. In this way, the powder is sintered into the desired tip shape, defined by the mold cavity. U.S. Pat. No. 3,969,156, issued July 13, 1976, discloses a method of making a dispersion strengthened copper alloy, resistance welding electrode in which discs of dispersion strengthened material are staked with discs of a copper alloy including chromium and zirconium, in an intermingled fashion, placed into a copper tube, and then extruded. Quenching and heat treatment operations are then performed for precipitation hardening of the chromium-zirconium portion in the extruded rod. Apparently, the Wallbaum '156 electrode is configured in a simple cylindrical rod shape. The Nadkarni et al '676 patent discloses a similar extrusion operation in which a powder metal mixture is dispersion strengthened within a sealed container by internal oxidation and thereafter extruded from the sealed container to produce dispersion-strengthened metal stock.

U.S. Pat. No. 4,045,644, issued Aug. 30, 1977, to Shafer et al, discloses a method of making a welding electrode of dispersion strengthened metal which includes the initial extrusion operation disclosed in the Nadkarni et al '676 patent. After extrusion to form the rod stock, the stock is cut to form an electrode blank with a tapered point. The electrode blank is then placed in a die arrangement and sufficient pressure is applied to the blank to cause the tip portion to flow in a direction transverse to the axis of the electrode so as to double the cross-sectional area of the tip, destroying the co-axial grain structure in the tip, and forming a nonfibrous isotropic grain structure. The cold forged electrode tip which results from this operation demonstrates increased resistance to deformation during the welding operation. The electrode shown in the Shafer et al '644 patent includes an internal cooling cavity for receiving cooling liquid during welding operations. Apparently, this cavity is machined subsequent to the other electrode forming operations. In general, the outer electrode shape is that of a cylindrical rod with a blunt, tapered tip portion.

For some resistance welding applications, it may be desirable to provide a relatively long electrode. In order to conserve the amount of dispersion strengthened material utilized in the electrode and, therefore, to reduce the cost of the electrode, it has been suggested that a bimetal electrode may be produced in which only the tip portion is formed of dispersion strengthened copper. The shank portion of the bimetal electrode can be cooled more efficiently may therefore be formed of a high conductivity copper material, as shown in U.S. Pat. No. 4,071,947, issued Feb. 7, 1978, to Nippert, and U.S. Pat. No. 4,288,024, issued Sept. 8, 1981, to Nippert, both assigned to the assignee of the present invention.

In the Nippert '947 patent, it is suggested that a bimetal billet may be formed by brazing together billets of high conductivity copper and dispersion strengthened copper alloy material. Prior to the brazing operation, the dispersion strengthened copper alloy billet is formed in an operation in which the material is worked to increase its hardness by altering its grain structure. The high conductivity portion of the bimetal billet is then back extruded to form the shank portion of the welding electrode, with this extrusion process hardening the conductive copper shank portion and, at the same time, forming the cooling recess.

In the Nippert '024 patent, a method of forming a bimetal resistance welding electrode having a dispersion strengthened copper alloy tip and a high conductivity copper shank is disclosed in which the tip portion of the electrode is formed in two successive upsetting operations to produce a tip member having a coating of high conductivity copper covering substantially all of one end. A solid, high conductivity copper billet is then formed and brazed to the tip member at its coated end, thus producing a bimetal extrusion blank. The extrusion blank is then back extruded with the high conductivity copper material being worked substantially, while only partially back extruding the tip portion of the extrusion blank. Clearly, a drawback with respect to an electrode forming operation such as disclosed in Nippert '024 and Nippert '947 in which the final working step is a back extrusion operation, forming the shank portion of the electrode and the cooling cavity recess, is that in order to produce a male resistance welding electrode in which the shank portion has a smaller diameter than the head or tip portion, a subsequent machining operation, in which the outer diameter of the shank portion is reduced, must be provided. It will be appreciated that such a machining operation will increase the cost of the electrode, both due to labor costs and scrap costs.

Accordingly, it is seen that there is a need for a method of making a male resistance welding electrode of a dispersion strengthened copper material in which substantial machining operations are not required to form the shank portion of the electrode and, additionally, in which the head portion of the electrode is worked sufficiently to produce an electrode of the desired hardness, with an isotropic grain structure.

SUMMARY OF THE INVENTION

The method of making a male resistance welding electrode of a dispersion strengthened copper material is provided which substantially reduces the scrap loss and the machining operations associated with prior art methods. The male electrode has a head portion at a first end thereof of a generally truncated conical shape and a truncated conical shank portion at the second end thereof. The shank portion defines a cylindrical recess therein and has an outer diameter which gradually reduces to a first diameter toward the second end of the electrode. The shank portion is of a second diameter and the head portion is of a third diameter at the point where the head portion and the shank portion meet. The second diameter is less than the third diameter and greater than the first diameter. The method includes of the steps of:

(a) placing a cylindrical cut-off billet of dispersion strengthened copper material in a first cylindrical die cavity of a first die, the die cavity being open at one end thereof and having an inner diameter substantially equal to the second diameter, the first die including a cylindrical pin located axially within the first die cavity and extending thereinto from the end opposite the open end of the first die cavity, the pin having an outer diameter substantially equal to the inner diameter of the recess;

(b) applying pressure to the cut-off billet adjacent the open end of the first die cavity to cause forward extrusion of the billet over the pin, thereby forming a preform billet of an outer diameter substantially equal to the second diameter and having the cylindrical recess formed in one end thereof;

(c) placing the preform billet in a second die cavity of a second die, the second die cavity being open at one end, the second die including a cylindrical pin of an outer diameter substantially equal to the inner diameter of the cylindrical recess located axially within the second die cavity and extending thereinto from the end opposite the open end of the second die cavity, the second die cavity defining a truncated conical cavity region around the cylindrical pin adjacent the end opposite the open end of the second die cavity, the truncated conical cavity region having an inner diameter adjacent the end opposite the open end of the second die cavity substantially equal to the first diameter and an inner diameter at the opposite end of the truncated conical cavity region substantially equal to the second diameter, the second die cavity further defining a substantially cylindrical cavity region around the cylindrical pin adjacent the open end of the second die cavity, the preform billet being placed in the second die cavity such that the cylindrical recess thereof receives the cylindrical pin;

(d) applying pressure with a first forming member to the end of the preform billet opposite the cylindrical recess to force the end of the preform billet surrounding the cylindrical recess into the truncated conical cavity region, thereby forming the shank portion of the electrode, while upsetting the end of the preform billet opposite the cylindrical recess to a diameter substantially equal to the third diameter, thereby working the end of the preform billet opposite the recess to produce a nonfibrous isotropic grain structure by substantially increasing the diameter thereof to form a semi-finished workpiece; and (e) while the semi-finished workpiece remains in the second die cavity, applying pressure to the end of the semi-finished workpiece adjacent the open end of the second die cavity with a second forming member defining a recess of a generally truncated conical shape to form the truncated conical head shape of the electrode, thereby producing the resistance welding electrode.

The cylindrical cut-off billet may have an outer diameter substantially equal to the second diameter. The dispersion strengthened copper material may be an internally oxidized copper-aluminum alloy. The first forming member may define a forming recess of a truncated conical shape which forms the end of the preform billet opposite the cylindrical recess.

The recess defined by the second forming member may include a central cylindrical recess which forms a cylindrical nose portion on the end of the electrode. The method may further include the step of removing the nose portion from the electrode, as by cutting.

The method may further include the step of machining the cylindrical recess of the welding electrode so as to enlarge the cylindrical recess.

The cross-sectional area of the preform billet opposite the cylindrical recess may be at least doubled by upsetting with the first forming member.

Accordingly, it is an object of the present invention to provide a method of making a male resistance welding electrode of a dispersion strengthened material in which machining operations subsequent to cold forming are minimized and in which the scrap material produced during the production of the electrode is minimized; to provide such a method in which the recess within the shank portion of the electrode is initially formed in a forward extrusion process in a first die and in which the head portion of the electrode is subsequently formed in an upsetting operation in a second die; to provide such a method in which a taper is added to the shank portion of the electrode during the upsetting operation in the second die; to provide such a method in which the head portion of the electrode is worked substantially in the second die by substantially doubling its cross-sectional area and converting the grain structure to a nonfibrous isotropic structure so as to cause hardening of said dispersion strengthened material; to provide such a method in which two forming operations for the head portion of the electrode are performed in the second die; to provide such a method in which the electrode is formed of an internally oxidized copper-aluminum alloy; and to provide such a method in which a cylindrical nose portion is formed on the head portion of the electrode and subsequently removed.

Other objects and advantages of the invention will be apparent from the following description, the accompanying drawings and the appended claims.

DETAILED DESCRIPTION OF THE PREFERRED EMBODIMENT

Figure 1:
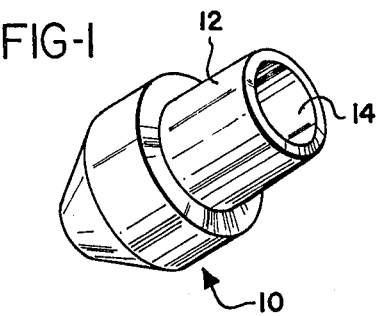
FIG. 1 is a perspective view of a male electrical resistance welding electrode made according to the method of the present invention.
Figure 2:
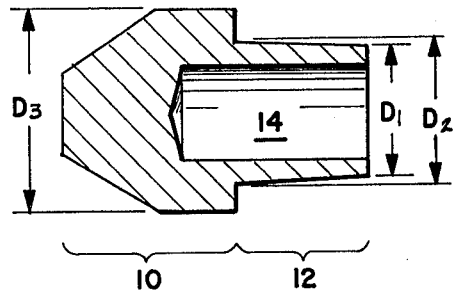
FIG. 2 is a sectional view taken generally through the central axis of the electrode.

Reference is made to FIGS. 1 and 2 which illustrate a male resistance welding electrode of the type which may be made of a dispersion strengthened copper material by the method of the present invention. The copper material may preferably be an internally oxidized copper-aluminum alloy of the type disclosed in U.S. Pat. No. 3,779,714, issued Dec. 18, 1973, to Nadkarni et al, and marketed by the Glidden-Durkee division of SCM Corp., Baltimore, Md. 21226, as GLID COPPER. This alloy resists annealing at elevated temperatures and is an extremely good electrical conductor, as well as being very hard. It has been found that these properties are accentuated by cold working of the alloy material.

The electrode has a head portion 10 at a first end thereof which is generally of a truncated conical shape. The electrode further has a truncated conical shank portion 12 at the second end thereof, which portion defines a cylindrical recess 14. The shank portion 12 has an outer diameter which gradually reduces to a first diameter $D_1$ toward the second end. The shank portion 12 is of a second diameter $D_2$ and the head portion 10 is of a third diameter $D_3$ at the point where the head portion 10 and the shank portion 12 meet. As shown, the second diameter $D_2$ is less than the third diameter $D_3$ and greater than the first diameter $D_1$. As indicated in U.S. Pat. No. 4,045,644, issued Aug. 30, 1977, to Shafer et al, it is known that if the electrode head portion is formed by an upsetting operation in which the dispersion strengthened material is caused to flow in a direction transverse to the electrode axis, a nonfibrous grain structure is produced which is extremely hard and has high electrical conductivity.

Figure 3A:
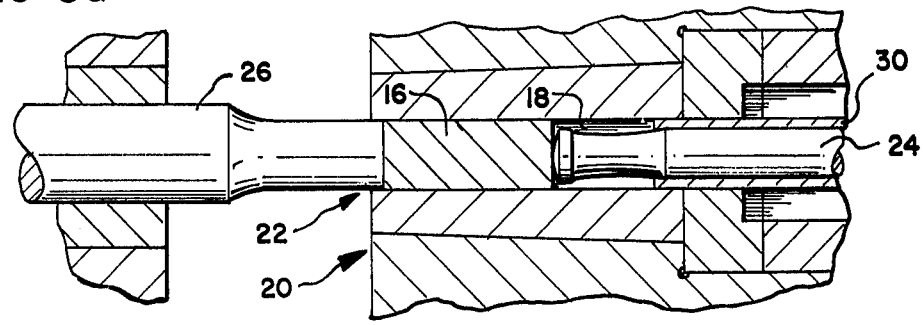
FIGS. 3a and 3b are sectional views illustrating placing a cylindrical cut-off billet in a first die and forward extruding the cylindrical cut-off billet to form a preform billet.

The method of making the male resistance welding electrode according to the present invention is shown in FIGS. 3a–5b. As shown in FIG. 3a, a cylindrical cut-off billet 16 of dispersion strengthened copper material is placed in a first cylindrical die cavity 18 of a first die 20. The cut-off billet 16 may preferably have been formed by shearing of an appropriate length of rod stock of dispersion strengthened copper material. The first die cavity 18 is open at end 22 and has an inner diameter substantially equal to the second diameter $D_2$. The first die 20 includes a cylindrical pin 24 located axially within the first die cavity 18 and extending thereinto from the end opposite the open end 22 of the cavity. The pin 24 has an outer diameter substantially equal to the inner diameter of the recess 14.

Figure 3B:
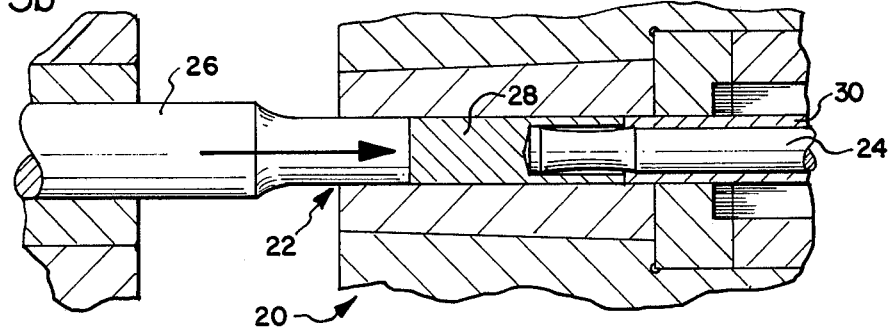
Figure 3C:
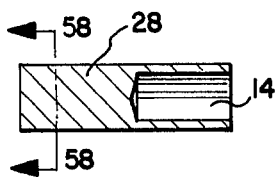
FIG. 3c is a sectional view of the preform billet.

A die punch 26 is provided to apply pressure to the cut-off billet 16 adjacent the open end 22 of the first die cavity 18 so as to cause forward extrusion of the billet 16 over the pin 24, as illustrated in FIG. 3b. This produces a preform billet 28 of an outer diameter substantially equal to the second diameter $D_2$, and having the cylindrical recess 14 formed in one end thereof. It will be appreciated that while one end of the cut-off billet 16 is substantially worked as it is forward extruded over the pin 24, since the inner diameter of die cavity 18 is substantially the same as the outer diameter of the cut-off billet 16, little metal flow in the other end of the billet 16 occurs during the forward extrusion process with the result that the grain structure of the copper material in this end of the preform billet is largely undisturbed.

Figure 4C:
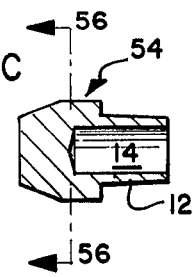
FIG. 4c is a sectional view of the semi-finished workpiece.
Figure 4A:
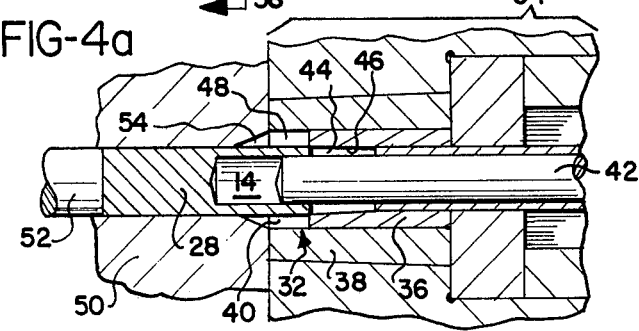
FIGS. 4a and 4b are sectional views illustrating placing the preform billet in a second die and forming a semi-finished workpiece by applying pressure to the preform billet with a first forming member.

After the preform billet 28 is produced in the first die 20, punch 26 is retracted and preform billet 28 is ejected by knockout sleeve 30. As shown in FIG. 4a, billet 28 is then placed in a second die cavity 32 defined by second die 34. Second die 34 includes a die case within which are positioned an inner die insert 36 and an outer die insert 38. The second die cavity 32 is open the end 40. The second die 34 further includes a cylindrical pin 42 of an outer diameter substantially equal to the inner diameter of the cylindrical recess 14 of the preform billet 28. Pin 42 is located axially within the second die cavity 32 and extends thereinto from the end opposite the open end 40 of the cavity.

The second die cavity 32 includes a truncated conical cavity region 44, defined between the pin 42 and tapered surface 46 of inner insert 36. The region 44 surrounds the pin 42 adjacent the end opposite the open end 40 of the cavity 32 and has an inner diameter adjacent its right end, as seen in FIG. 4a, substantially equal to the first diameter $D_1$ and an inner diameter at the opposite end thereof substantially equal to the second diameter $D_2$. The second die cavity further includes a substantially cylindrical cavity region 48 around the cylindrical pin 42 adjacent the open end of the second die cavity. The substantially cylindrical cavity region 48 has an inner diameter substantially equal to the third diameter $D_3$.

Figure 4B:
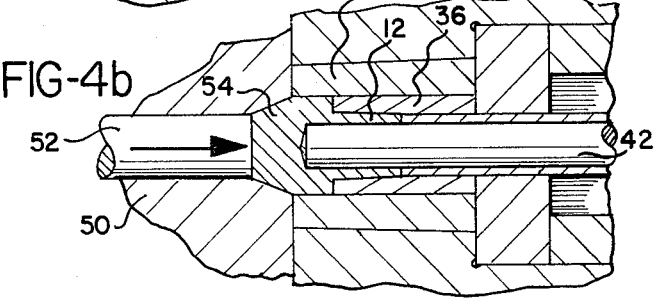

As seen in FIG. 4a, the preform billet 28 is placed in the second die cavity 32 such that the cylindrical recess 14 receives the end of cylindrical pin 42. It will be appreciated that since the outer diameter of the preform billet 28 is substantially the same as the inner diameter $D_2$ of the region 44 in the center of the cavity 32, the billet 28 initially cannot be inserted completely into the truncated conical cavity region 44. Initially, as seen in FIG. 4a, one end of the billet 28 is received within a first forming member 50, which member includes a power driven punch 52. The member 50 defines a forming recess 54 of a truncated conical shape which surrounds the opening within member 50 into which billet 28 is placed. Next, pressure is applied with the punch 52 of the first forming member to the end of the preform billet 28 opposite the cylindrical recess 14 so as to force the end of the preform billet surrounding the cylindrical recess 14 into the truncated conical cavity region 44, thereby forming the shank portion 12 of the electrode, as shown in FIG. 4b. At the same time, the end of the preform billet opposite the recess 14 is upset to a diameter substantially equal to the third diameter $D_3$, thereby working the end of the preform billet opposite the recess by substantially increasing the diameter thereof to form a semi-finished workpiece 54, as shown in FIG. 4c. Although the end of workpiece 54 which will ultimately become the head portion 10 of the electrode has a slight taper and therefore is not of uniform cross-sectional area, the cross-sectional area of workpiece 54 taken along plane 56—56 is preferably at least twice the cross-sectional area taken along plane 58—58 of the preform billet 28. This increase in cross-sectional area results in a conversion of the previously co-axial grain structure to a nonfibrous isotropic grain structure which is extremely hard.

Figure 5A:
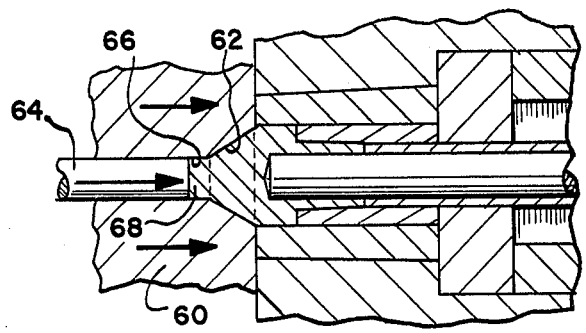
FIG. 5a is a sectional view illustrating the application of pressure to the semi-finished workpiece in the second die by a second forming member so as to produce the resistance welding electrode.
Figure 5B:
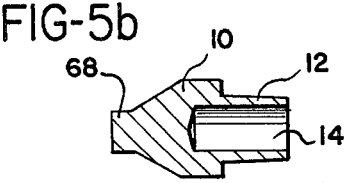
FIG. 5b is a sectional view of the resistance welding electrode, prior to removal of a cylindrical nose portion on the end of the electrode.

While the semi-finished workpiece 54 remains in the second die cavity of die 34, pressure is applied to the end of the semi-finished workpiece 54 with a second forming member 60. Member 60 defines a recess 62 of a generally truncated conical shape. The second forming member 60 includes a pin 64 which moves in unison with the member 60. The member 60 further defines a central cylindrical recess 66 which forms a cylindrical nose portion 68 on the head 10 of the electrode, as shown in FIG. 5b. This nose portion 68 is subsequently removed by cutting or machining to produce the final electrode, shown in FIGS. 1 and 2. The purpose of forming the nose portion 68 is to gather together the dispersion strengthened copper material which was adjacent the end of the cylindrical cut-off billet 16 where the billet 16 sheared from a piece of rod stock. Such a shearing operation produces an end surface on the billet 16 which is rough and irregular. It has been found that irregularities in the surface of billet 16 results in an electrode having an irregular surface on the end of its head portion. Further, it has been found that such irregularities, if not removed, result in premature electrode failure.

By the method of the present invention the irregularities are pinched together into the nose portion 68. The nose portion 68 is then removed, as by cutting or machining, thus producing an electrode having the desired smooth head portion surface. If desired, the recess 14 may also be deepened by a subsequent machining operation. Both of these machining operations result in only a minimum quantity of scrap being produced, the major electrode shaping operations having been cold forming and extruding operations.

While the method herein described constitutes the preferred embodiment of the invention, it is to be understood that the invention is not limited to this precise method and that changes may be made therein without departing from the scope of the invention.

What is claimed is:

1. A method of making a male resistance welding electrode of a dispersion strengthened copper material, said electrode having a head portion at a first end thereof of a generally truncated conical shape and a truncated conical shank portion at the second end thereof, said shank portion defining a cylindrical recess therein and having an outer diameter which gradually reduces to a first diameter toward said second end, said shank portion being of a second diameter and said head portion being of a third diameter at the point where said head portion and said shank portion meet, said second diameter being less than said third diameter and greater than said first diameter, comprising the steps of:

placing a cylindrical cut-off billet of dispersion strengthened copper material in a first cylindrical die cavity of a first die, said first die cavity being open at one end thereof and having an inner diameter substantially equal to said second diameter, said first die including a cylindrical pin located axially within said first die cavity and extending thereinto from the end opposite said open end of said first die cavity, said pin having an outer diameter substantially equal to the inner diameter of said recess, applying pressure to said cut-off billet adjacent said open end of said first die cavity to cause forward extrusion of said billet over said pin, whereby a preform billet is produced of an outer diameter substantially equal to said second diameter and having said cylindrical recess formed in one end thereof, placing said preform billet in a second die cavity of a second die, said second die cavity being open at one end, said second die including a cylindrical pin of an outer diameter substantially equal to the inner diameter of said cylindrical recess, located axially within said second die cavity and extending thereinto from the end opposite said open end of said second die cavity, said second die cavity including a truncated conical cavity region around said cylindrical pin adjacent the end opposite said open end of said second die cavity, said truncated conical cavity region having an inner diameter adjacent said end opposite said open end of said second die cavity substantially equal to said first diameter and an inner diameter at the opposite end of said truncated conical cavity region substantially equal to said second diameter, said second die cavity further including a substantially cylindrical cavity region around said cylindrical pin adjacent the open end of said second die cavity, said substantially cylindrical cavity region having an inner diameter substantially equal to said third diameter, said preform billet being placed in said second die cavity such that said cylindrical recess thereof receives said cylindrical pin, applying pressure with a first forming member to the end of said preform billet opposite said cylindrical recess to force the end of said preform billet surrounding said cylindrical recess into said truncated conical cavity region, thereby forming said shank portion of said electrode, while upsetting the end of said preform billet opposite said cylindrical recess to a diameter substantially equal to said third diameter, thereby working said end of said preform billet opposite said recess to produce a nonfibrous grain structure by substantially increasing the diameter thereof to form a semi-finished workpiece, and while said semi-finished workpiece remains in said second die cavity, applying pressure to the end of said semi-finished workpiece adjacent said open end of said second die cavity with a second forming member defining a recess of a generally truncated conical shape to form said truncated conical head shape of said electrode, thereby producing said resistance welding electrode.

2. The method of claim 1 in which said cylindrical cut-off billet has an outer diameter substantially equal to said second diameter.

3. The method of claim 1 in which said dispersion strengthened copper material is an internally oxidized copper-aluminum alloy.

4. The method of claim 1 in which said first forming member defines a forming recess of a truncated conical shape which forms the end of said preform billet opposite said cylindrical recess.

5. The method of claim 1 in which said recess defined by said second forming member includes a central cylindrical recess which forms a cylindrical nose portion on the head portion of said electrode.

6. The method of claim 5, further including the step of removing said nose portion from said electrode.

7. The method of claim 6 in which said nose portion is removed by cutting.

8. The method of claim 1, further comprising the step of machining said cylindrical recess of said welding electrode so as to enlarge said cylindrical recess.

9. The method of claim 1 in which said cross-sectional area of said preform billet at the end opposite said cylindrical recess is at least doubled by upsetting with said first forming member, so as to produce a nonfibrous isotropic grain structure.

* * * * *